United States Patent [19]

Olofsson

[11] Patent Number: 5,417,068
[45] Date of Patent: May 23, 1995

[54] EXHAUST GAS FLOW SYSTEM FOR AN INTERNAL COMBUSTION ENGINE FITTED WITH A SUPERCHARGER, AND METHOD USED FOR SUCH A SYSTEM

[75] Inventor: Eric Olofsson, Rönninge, Sweden

[73] Assignee: Saab Automobile Aktiebolag, Sweden

[21] Appl. No.: 232,277

[22] PCT Filed: Sep. 10, 1993

[86] PCT No.: PCT/SE93/00740
§ 371 Date: May 6, 1994
§ 102(e) Date: May 6, 1994

[87] PCT Pub. No.: WO91/08388
PCT Pub. Date: Jun. 13, 1991

[30] Foreign Application Priority Data

Sep. 11, 1992 [SE] Sweden ............................. 9202618

[51] Int. Cl.⁶ ............................................. F02B 33/44
[52] U.S. Cl. ......................................... 60/605.1; 60/602
[58] Field of Search ............................. 60/602, 605.1

[56] References Cited

U.S. PATENT DOCUMENTS 4,207,742  6/1980  Dommes et al. ................. 60/605.1

FOREIGN PATENT DOCUMENTS

3821935  2/1990  Germany ............................ 60/602
0119922  7/1983  Japan ............................... 60/605.1
9108388  6/1991  WIPO ................................ 60/602

Primary Examiner—Richard A. Bertsch
Assistant Examiner—Charles G. Freay
Attorney, Agent, or Firm—Ostrolenk, Faber, Gerb & Soffen

[57] ABSTRACT

Exhaust flow system for a split exhaust flow in a multi-cylinder internal combustion engine (3) fitted with an exhaust-driven supercharger (2) of the turbocompressor type, whose exhaust system incorporates a catalytic exhaust cleaner (58; 58'), where each cylinder of the engine has both a first exhaust valve (51), from which released exhaust gas is fed to a first exhaust collector (53) common to the cylinders, which collector is connected directly to the exhaust turbine inlet by a first exhaust branch pipe (54), and a second exhaust valve (52), from which released exhaust gas is fed to an exhaust pipe (56), which incorporates a silencer (61). At least one valve (50) adjustable according to the operating conditions of the engine (3), is arranged downstream from the second exhaust valves (52) of the cylinders, in their connection (59, 55, 57) to the exhaust pipe (56) between the exhaust turbine outlet (20) and the silencer (61).

23 Claims, 5 Drawing Sheets

CYLINDER 1

CYLINDER 3

CYLINDER 4

CYLINDER 2

TIME

EXHAUST GAS FLOW SYSTEM FOR AN INTERNAL COMBUSTION ENGINE FITTED WITH A SUPERCHARGER, AND METHOD USED FOR SUCH A SYSTEM

The invention relates to an exhaust gas flow system for split exhaust gas flow in a four cylinder internal combustion engine with an exhaust-driven turbocompressor, and to a method used in this connection.

STATE OF THE ART

As a relatively close approximation it may be stated that there is an essentially linear relationship between the air consumption of an Otto engine and its output. It is therefore very important for the engine cylinders to be drained of all exhaust gases after the expansion stroke so that they can again be filled with the maximum quantity of air and fuel. The reduction in volume caused by the piston during the exhaust stroke forces out the exhaust gases remaining in the cylinder after the primary draining of exhaust gas occurring at the lower dead center. When the piston turns at the upper dead center after the exhaust stroke has been completed, it is important to dispose of as much of the exhaust gases remaining in the combustion chamber as possible. This is achieved when the intake valves of the cylinder is/are opened immediately before the upper dead center, and its exhaust valves is/are closed immediately after the upper dead center. During the time both the intake and exhaust valves are open an instantaneous, positive pressure drop must therefore be present above the engine, i.e. the pressure in the intake manifold must be higher than in the exhaust collector. If this is the case the engine is able to flush the combustion chamber of all the exhaust gases to allow subsequent refilling with air.

However, the vehicle engines in current use are not capable of draining completely these last remaining exhaust gases (residual gases), and considerable quantities of such residual gases therefore remain in the cylinder when refilling of air commences, which has a negative effect on the possible engine output. The quantity of residual exhaust gases therefore has a detrimental effect on both the specified mean pressure, torque and output.

As far as internal combustion engines fitted with an exhaust-drive supercharger of the turbocompressor type are concerned, i.e. the turbo engines mentioned below, problems arise when attempting to achieve the required performances because interference pulses are generated on the exhaust side of the engine. These interference pulses normally give rise to relatively large quantities of residual gases in the cylinders, which means that the performances aimed for, which might otherwise be achieved, are not possible because of the negative effect of the interference pulses.

In order to minimize the quantities of residual gas formed due to the interference pulses from the turbo engine, the aim should therefore be to reduce or avoid such interference pulses.

One method of prior art for attempting to overcome this problem is the evacuation, via a first exhaust valve in each cylinder, of a first exhaust pulse with the highest pressure directly to the exhaust turbine inlet, whereupon the remaining exhaust gases (the residual gases) are evacuated via a second exhaust valve in each cylinder, after the first-mentioned exhaust valve has closed, and are allowed to escape "freely" from the cylinder, i.e. without obstruction, through a separate exhaust port designed for this secondary exhaust flow.

Reference may be made to GB 2 185 286, for instance, as an example of such a method of prior art.

SUMMARY OF THE INVENTION

This invention relates to a further development of this method of prior art with a split exhaust period (split exhaust gas flow), and its objective is to optimise the exhaust system in a turbo engine, thereby improving performance, using the two exhaust valves in each cylinder which have now become increasingly common in vehicle engines, for example four cylinder turbo engines with 16 valves.

In the light of this the objective is to ensure that the flushing of each cylinder in the engine is not negatively influenced by the exhaust pulses from the other cylinders of the engine. This could improve the degree of filling and substantially increase the output of the engine, as well as its torque.

In other words the invention is based on the realisation that the combustion chamber and exhaust turbine need not or should not be in mutual communication throughout the exhaust stroke (exhaust period), since in practice the turbine has already largely disposed of the entire exhaust flow approximately 50 degrees after the lower dead center, and is therefore able to transmit the required power to the supercharger compressor. During the remainder of the exhaust stroke the flushing will be negative at high speeds because the exhaust turbine will then act as a "throttle" for the engine. At the end of the exhaust stroke in each cylinder the interference pulse is generated from the next cylinder in the engine firing order, resulting in a substantial generation of residual gases.

The basic concept of the split exhaust period (i.e. split exhaust gas flow from the engine cylinders) is that the cylinder and turbine are interconnected when an angle of crankshaft rotation of approximately 50 degrees remains of the expansion stroke. Approximately 100 crankshaft rotation degrees later the cylinder is practically drained of all the exhaust gases, breaking the connection between the cylinder and turbine. During the remainder of the exhaust stroke the cylinder communicates with the surrounding atmosphere, for example, thereby eliminating the interference pulse. A positive pressure drop, equal to the charging pressure minus the back pressure prevailing in the exhaust system, is maintained above the engine with suitable valve overlapping, thereby allowing effective flushing of the respective combustion chambers.

An exhaust flow system according to the invention therefore involves a split exhaust flow from the engine, where the exhaust gases for driving the exhaust turbine of the supercharger are discharged from the cylinders of the engine via its first exhaust valves, while the secondary exhaust flow (the residual exhaust gas flow) from the cylinders is discharged via its second exhaust valves. At least one adjustable valve is arranged in the connection between these second exhaust valves and the exhaust pipe leading from the exhaust turbine outlet and out into the surrounding atmosphere. Such an adjustable valve may then conceivably be fitted for each of these second exhaust valves, but in practice it should be quite adequate, and is preferable, for the exhaust flow system to contain only one such adjustable valve, which will then be common to all the exhaust valves of the second type.

The outlets from the second exhaust valves in the cylinders may suitably be connected to a common second exhaust collector, which is connected in turn, via a second exhaust branch pipe, to the exhaust pipe which runs from the turbine outlet and incorporates the silencer at its downstream end.

The adjustable valve common to the second exhaust valves of the cylinders (i.e. the exhaust valves of the second type) is then suitably connected in this second exhaust branch pipe.

Due to the adjustable valve, with which the exhaust flow can therefore be regulated from the second exhaust valves of the cylinders, suitable/required back pressure can be built up in this secondary exhaust flow directed past the turbocompressor. This enables the pressure drop over the engine to be varied during the intake/exhaust valve overlap. For complete flushing at high loads of over 2000 rpm the adjustable valve should be fully open, thereby giving rise to the maximum possible positive pressure drop over the engine.

At low speeds, however, the control valve should not be kept fully open because in that case the exhaust turbine is unable to build up sufficient charging pressure, particularly at speeds lower than say 2000 rpm. In that case the engine would certainly give a very high torque in relation to the charging pressure, but the turbine requires assistance from the variation in piston displacement during the exhaust stroke to build up full charging pressure. However, where the control valve is fully open this auxiliary work is lost because the second exhaust valves of the cylinders are designed to open approximately 50 crankshaft rotation degrees after the lower dead center. When the control valve is fully closed, however, the exhaust turbine is able to build up full charging pressure even at a speed as low as approximately 1600 rpm.

At a speed of 2000 rpm the adjustable valve should therefore be closed at least to the extent that a sufficient back pressure, e.g. 0.25 bar, is built up in the exhaust flow from the second exhaust valves. In this case the turbine is able to build up the required charging pressure, e.g. 1 bar. Thus the adjustable valve should preferably be at least partially closed.

A certain flushing action can also be achieved with the adjustable valve fully closed in that exhaust gases are forced out into the "bag volume" which the second exhaust collector, equivalent the exhaust collector for the second exhaust valves of the cylinders,) then forms, with overflow in through the second exhaust valve of another cylinder, and on through its first exhaust valve. During the valve overlap for the first and second exhaust valve of a cylinder the residual gases forced into the second exhaust system, during the intake/exhaust valve overlap of the previous cylinder in the firing order, will flow from the second exhaust system into the cylinder via the second exhaust valve, and then out from the cylinder via the first exhaust valve and the exhaust turbine. The respective cylinders in the engine are therefore flushed clean by the second exhaust system and the next cylinder in the firing order.

At speeds as low as 1600 rpm, for example, the back pressure in the exhaust collector is largely eliminated. When the speed has increased to say 2500 rpm, the exhaust turbine is able to build up full charging pressure even with the adjustable valve fully open. At a speed ranging from 3000 to 3500 rpm it is necessary to build up a back pressure in the exhaust flow from the second exhaust valves of the cylinders so that the flushing flow, and hence the exhaust temperature before the exhaust turbine, are reduced to an acceptable level. At speeds as high as say between 4000 and 4500 rpm the engine is in practice constrained very much by the exhaust temperature before the turbine. The adjustable valve in the secondary exhaust flow (the residual gas flow) from the second exhaust valves of the cylinders is in practice only kept fully open at a speed higher than say 2000 rpm. Moreover, the adjustable valve enables any quantity of residual gases to be saved at partial load, thereby providing a control of the quantity of thermal nitrous oxide and uncombusted hydrocarbons generated by the engine.

The invention will now be described and explained in further detail below with reference to embodiments shown in the attached drawings.

DESCRIPTION OF PREFERRED EMBODIMENTS

Figure 1:
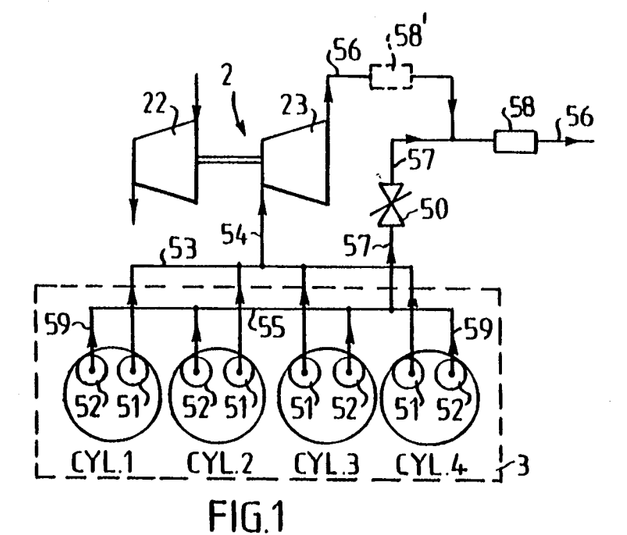
FIG. 1 shows diagrammatically the basic connection of the main components of the exhaust flow system according to the invention.

FIG. 1 shows diagrammatically an exhaust flow system for a split exhaust flow in a four-cylinder Otto engine 3, which is fitted with an exhaust-driven supercharger 2 of the turbocompressor type. The four cylinders of the engine each have two exhaust valves 51 and 52. Exhaust gas is released from the first exhaust valves 51 of the cylinders to a first exhaust collector 53, common to the cylinders, which collector is connected directly to the inlet of the exhaust turbine 23 of the supercharger, via a first exhaust branch pipe 54. Exhaust gas is discharged from the second exhaust valves 52 of the cylinders to a second exhaust collector 55, common to the cylinders, which collector is connected to an exhaust pipe 56 leading from the outlet of turbine 23, via a second exhaust pipe 57 incorporating a throttle valve 50, common to the second exhaust valves 52 of the cylinders, which throttle valve is designed to be adjustable according to the engine operating conditions. A silencer is installed in the normal manner in the downstream section, not shown, of exhaust pipe 56, and the downstream end of the exhaust pipe consists of an exhaust pipe end opening into the surrounding atmosphere. A catalytic exhaust cleaner connected in exhaust pipe 56 is denoted by 58 in the figure, but this position of the exhaust cleaner is not the only conceivable position, but an alternative position of the catalytic cleaner would be that indicated in the figure by 58'.

Figure 2:
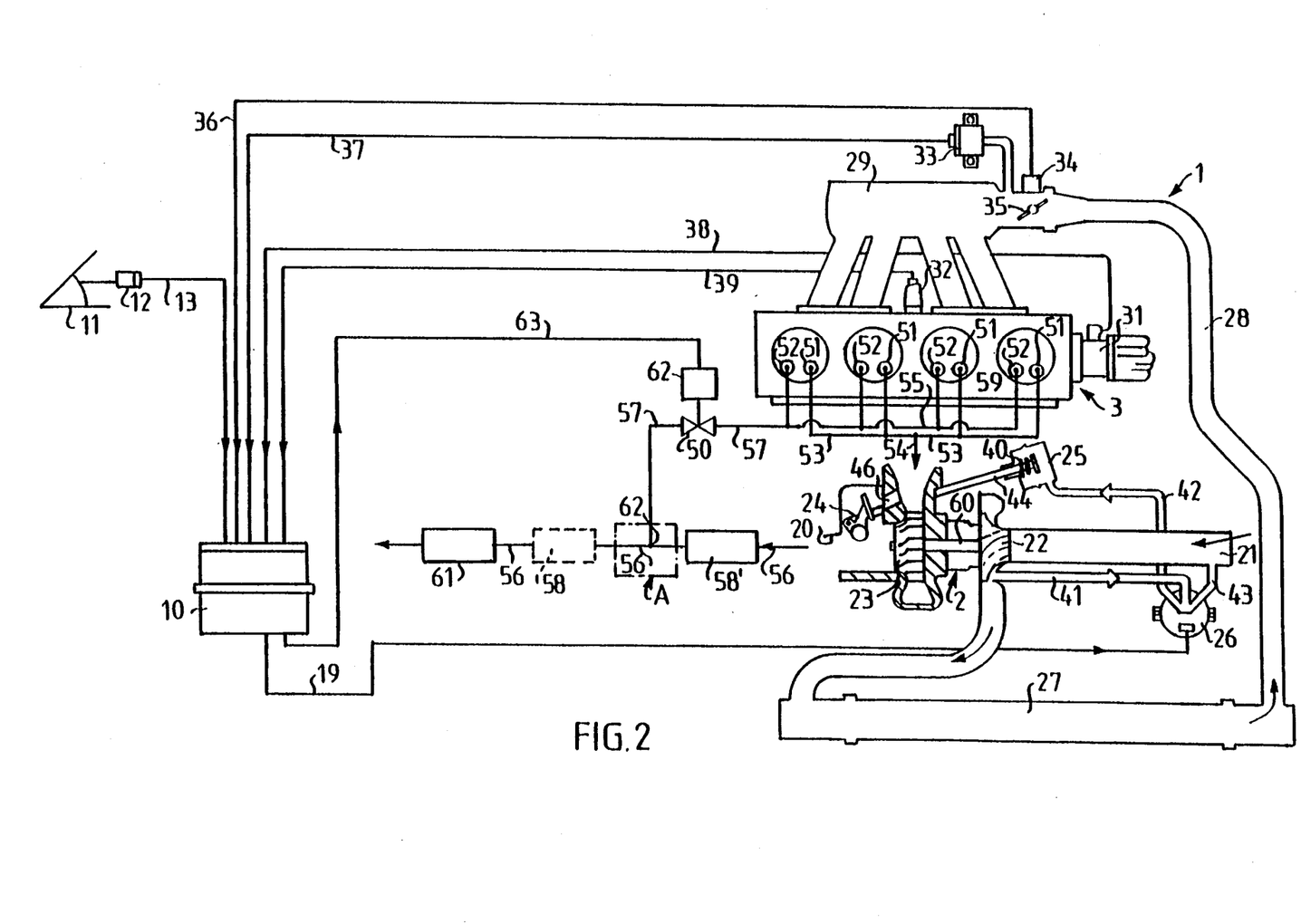
FIG. 2 shows in greater detail a diagram of an exhaust flow system according to the invention.

FIG. 2 shows in greater detail how an exhaust flow system according to the invention may behave in a four-cylinder Otto engine 3 fitted with an exhaust-driven supercharger 2 of the turbocompressor type. The supercharged internal combustion engine shown differs from a conventional aspirated engine in that it provides improved filling during the intake stroke by means of supercharger 2, which increases the output and torque of the engine. Performances comparable to those of a larger engine are obtained with the aid of supercharger 2, but this is achieved while retaining the advantages of the smaller engine in terms of low mechanical losses, space requirement and weight.

In the embodiment shown engine 3 is supercharged by means of a supercharger of the turbocompressor type (also called turbo), which means that the engine's 3 own exhaust gases are used as the driving medium for the supercharger. The exhaust gases from exhaust collector 53 for the first exhaust valves 51 of the cylinders are fed through the exhaust turbine 23 of the supercharger, thereby causing the turbine impeller to rotate. The impeller of turbine 23 is mounted rigidly on the same shaft 60 as compressor impeller 22 of the supercharger, and therefore rotates at the same speed as this impeller. Compressor impeller 22 is positioned in the intake system 21, 27, 28, 29, and therefore gives rise to an increase in pressure to provide improved filling in the cylinders of internal combustion engine 3.

By dimensioning the turbo for early intervention, i.e. for a substantial build-up of charging air pressure even at a relatively low speed, a higher torque is obtained in speed ranges which are used under normal driving conditions. Previously a common approach for adaption of the turbo was to give an increased peak output, which meant that the turbo was operating mainly in the upper speed range of the engine under high engine loads.

The charging pressure in intake manifold 29 depends mainly on the engine speed and load. At a higher load, however, the charging pressure is limited by a charging pressure regulator 24, 25, 40, 44. The charging pressure regulator is located on the exhaust side of the engine and regulates the exhaust flow through a by-pass duct at the side of exhaust turbine 23, via a waste-gate valve 24.

When the load increases and the charging pressure approaches the setpoint fixed for the operating conditions, waste-gate valve 24 opens and allows some of the exhaust gases to pass through by-pass duct 46 directly to exhaust turbine outlet 20, at which point exhaust turbine 23 is load relieved. Waste-gate valve 24 is actuated by a control rod 44 from a diaphragm dash-pot 25 mounted on supercharger 2. A spring 40 in diaphragm dash-pot 25 close waste-game valve 24. The diaphragm is actuated by the compressor pressure which is fed via a pipe 41 across a solenoid valve 26, and on into a pipe 42 to diaphragm dash-pot 25. Solenoid valve 26 is controlled conventionally by an electrical control unit 10, by electrical pulse width modulation, between a closed and open position. In the closed position a discharge duct 43 is closed, which means that the diaphragm dash-pot 25 is actuated by the full pressure after compressor 22. The charging pressure regulator then opens waste-gate valve 24 at a lower charging air pressure level, which is determined by its basic setting with appropriately adjusted return spring 40. In the open position the pressure is discharged through discharge duct 43 to the inlet side of the compressor. Diaphragm dash-pot 25 of the charging pressure regulator is therefore depressurised and then closes waste-gate valve 24, which gives a maximum charging air pressure after the compressor, when the entire exhaust flow passes through exhaust turbine 23, which of course drives compressor 22 directly.

During driving the solenoid valve pulsates between the open and closed position at a fixed frequency, e.g. 12 hertz. Because of the pulse width modulation of control unit 10 the relationship is changed between the time the solenoid valve is open and closed during one pulse cycle. The level of the charging air pressure can therefore be regulated by control unit 10, according to the engine parameters detected. Control unit 10, which in practice consists of a conventional microcomputer with integrated memory units, receives electrical signals from a knock sensor 32 arranged on the engine block, a pressure sensor 33 arranged in intake manifold 29, a distributor-based speed sensor 12, a throttle position potentiometer 34 and an accelerator pedal position sensor 31, via cables 39, 37, 38, 36 and 13 respectively.

The second exhaust collector 55 common to the second exhaust valves 52 of the cylinders is connected by the second exhaust branch pipe 57 to exhaust pipe 56, which leads from the outlet 20 of the exhaust turbine to a silencer 61 incorporated in the exhaust system, from which the exhaust gases are fed on to the pipe end of the exhaust pipe opening into the surrounding atmosphere.

Exhaust branch pipe 57, in which adjustable throttle valve 50 is inserted, therefore opens into exhaust pipe 56 at a mixing point 52 located between two conceivable, alternative positions of catalytic exhaust cleaner 58' and 58 respectively. The static pressure at point 62 may be expected to be approximately 0.3 bar.

Adjustable valve 50 in the second exhaust branch pipe 57 is fitted with an adjusting device 65, serving to open/close the valve adjustably, to which device is connected a signal cable 63 from electrical control unit 10. This electrical control unit which, as mentioned above, receives relevant operating parameter input signals via cables 13, 36, 37, 38 and 39 from different sensors, is therefore the unit which controls the degree of opening and closing of adjustable valve 50. In practice valve 50 is controlled so that the valve is open at high loads over 2000 rpm. At other loads/speeds valve 50 is closed, see FIG. 8.

The following may briefly be mentioned regarding both exhaust valves 51, 52, of the cylinders. The first exhaust valve 51 of each cylinder is designed for the primary exhaust flow of the cylinder, which takes place by keeping the valve open around the lower dead center, preferably during the last 50 crankshaft rotation degrees of the expansion stroke and the first 50 crankshaft rotation degrees of the exhaust stroke. The second exhaust valve of each cylinder, i.e. exhaust valve 52, is designed for the secondary exhaust flow (residual exhaust draining) of the cylinder, which flow takes place by keeping the valve open after the piston has passed the lower dead center, preferably from and including a crankshaft rotation of approximately 50 degrees from the lower dead center.

Figure 3:
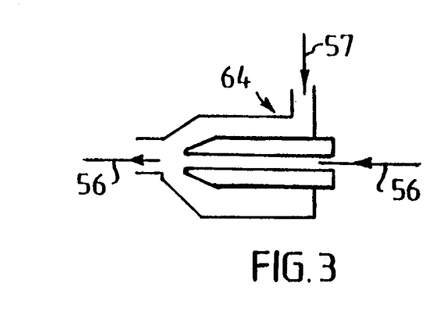
FIG. 3 shows diagrammatically an alternative design of the point of connection between the two exhaust flow paths of the exhaust flow system, shown in FIG. 2 within the dash dot rectangle A.

The adjustable exhaust flow from the second exhaust valves 52 of the cylinders does not necessarily need to be introduced into exhaust pipe 56 at the single mixing point 62, as shown in FIG. 2. As an alternative to this the downstream end of second exhaust branch pipe 57 can be connected to exhaust pipe 56 via an ejector 64 connected in the same. This alternative design is indicated in FIG. 3, which on a slightly larger scale shows the connection area which, in FIG. 2, lies within the dash dot rectangle denoted by A.

Internal combustion engines with superchargers of the turbocompressor type can quite generally be said to suffer from the disadvantage that the exhaust turbine more or less "corks" the engine. This problem has so far been discussed assuming that the pressure in the intake manifold and exhaust collector is constant during the operating cycle of the engine. This is largely correct as far as the intake manifold is concerned, but not for the exhaust collector. Instead a highly pulsating pressure prevails in the exhaust collector. What is of most interest as far as the engine is concerned is the pressure prevailing in the exhaust collector for the short time of the total operating cycle comprising the valve overlap.

As already discussed above, the exhaust valves begin to open 50 degrees before the lower dead center. At full load the pressure in the cylinder at this crankshaft angle is of the order of 7-9 bars, depending on the speed and hence the charging pressure. Immediately after the valve opens the pressure between the cylinder and exhaust collector begins to equalise. The pressure then drops in the cylinder, but rises in the exhaust collector because the exhaust gases flow from the cylinder to the exhaust collector. As soon as the pressure in the exhaust collector rises exhaust gases begin to flow to and through exhaust turbine 23. In the exhaust collector a general pressure course is then obtained along the curve shown in FIG. 4. As is shown the pressure rises quickly immediately after the exhaust valves open, then drops again according to an exponential function curve. The pressure in the exhaust collector will therefore be highest when the draining cylinder is at or immediately after the lower dead center (LDC). The level of this pressure peak depends on the volume in the exhaust ducts, exhaust collector and turbine housing. If this volume is large, the pressure surges in the exhaust collector are damped.

Figure 5:
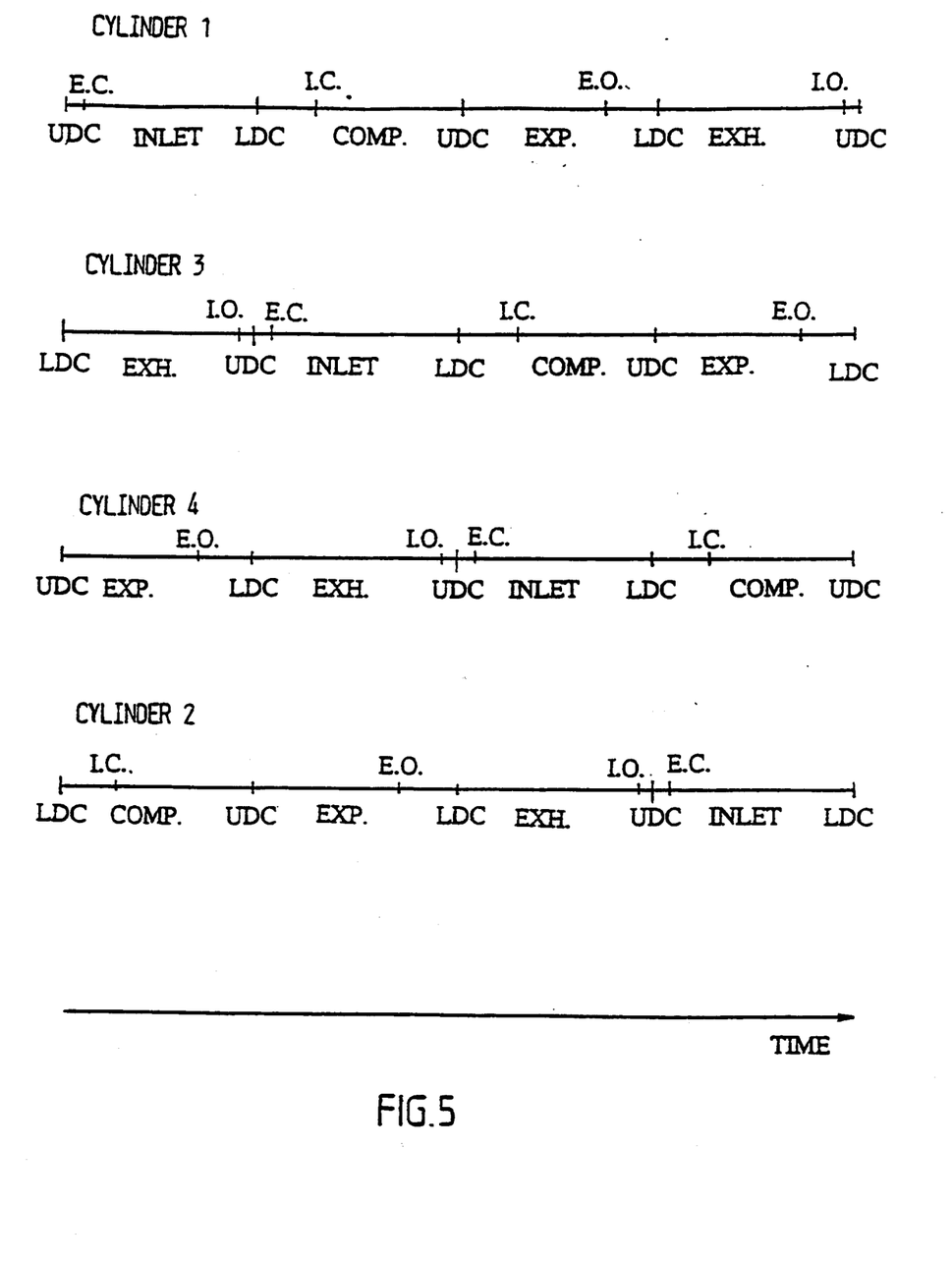
FIG. 5 shows the operating cycles of the cylinders in a four-cylinder four-stroke engine.

We shall now study how the operating cycles of the individual cylinders relate to each other in time in the case of a four-cylinder, four-stroke engine with a firing order of 1, 3, 4, 2. In this connection reference is made to FIG. 5, which clearly shows how cylinder 4, for example, causes a pressure surge in the exhaust collector at the same time as cylinder 3 has both intake and exhaust valves open. The pressure surge which occurs in the exhaust every 180 crankshaft revolution degrees therefore always coincides with the fact that one of the cylinders is at valve overlap. The configuration of a four-cylinder, four-stroke engine with only one exhaust turbine is therefore unsuccessful from the point of view of flushing. If the number of cylinders in the engine is instead a multiple of three, the most favourable initial position for a turbo engine is obtained. The cylinder which causes the pressure surge in the exhaust collector causes a considerable instantaneous negative drop in pressure for the cylinder located half a revolution forward in the operating cycle.

Figure 4:
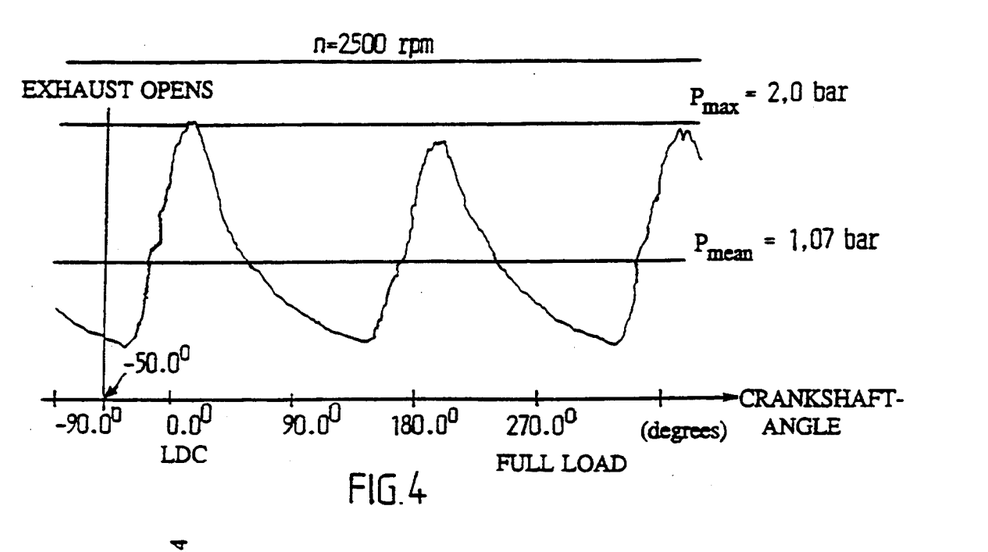
FIG. 4 shows the course of the pressure in the exhaust collector between the engine and the exhaust turbine of a standard engine.

As shown in FIG. 4 the maximum pressure in the exhaust collector in a standard engine at a speed of 2500 rpm is barely 1 bar higher than the mean pressure. At the valve overlap the engine has a negative pressure drop of approx. 1.0 bar. The amplitude reduces with speed and at 5500 rpm it is approximately 0.5 bar. The negative pressure drop over the engine, which counteracts flushing, increases with speed in a standard engine in which all the exhaust valves open to the exhaust turbine.

Figure 6:
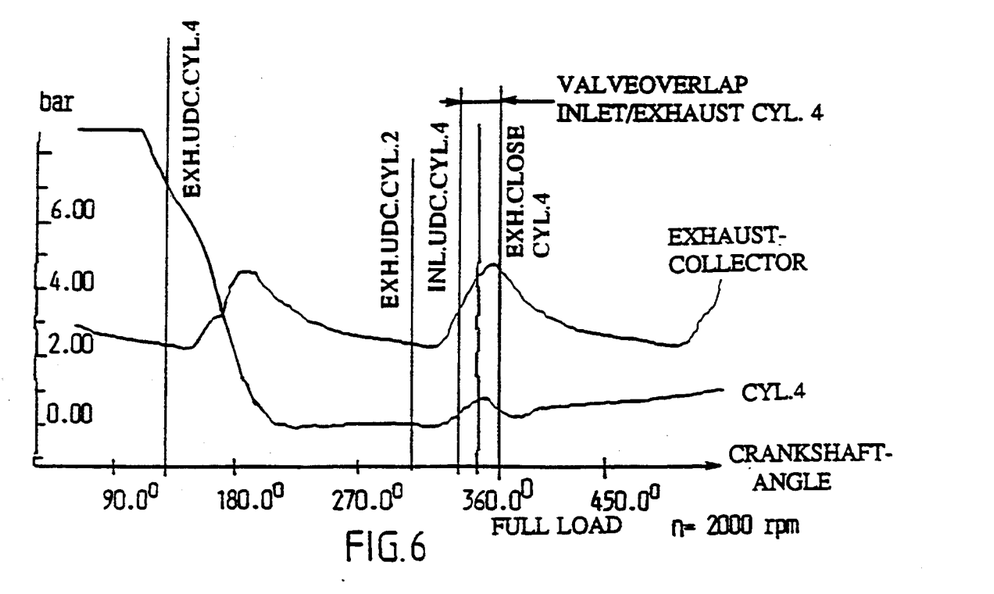
FIG. 6 shows the pressure in a cylinder and in the associated exhaust collector as a function of the angle of rotation of the crankshaft.

The graph in FIG. 6 plots the pressure in the cylinder (CYL.4) and pressure in the exhaust collector against the crankshaft angle. It should be observed how closely the pressure increase in the cylinder— just before and during the valve overlap— is linked to the pressure increase in the exhaust collector. Also note that the abscissa scale only applies to the pressure in the cylinder. The pressure curve for the exhaust collector is only included to show how the pressure surge in the exhaust collector as an interference pulse which gives rise to considerable interference in the combustion chamber located at the overlap. The level of the pressure in the exhaust collector can be read off from the graph in FIG. 4.

The quantity of residual gases generated by the interference pulse can only be the subject of speculation. As can be seen the pressure in the combustion chamber increases by almost 1 bar as a result of the interference pulse. The first pressure surge in the exhaust collector pulse train in FIG. 6 derives from the cylinder whose combustion chamber pressure curve is drawn in the graph. It should be noted how the pressure in the exhaust collector rises in the crank angle range of 140-190 degrees, while the pressure in the cylinder drops sharply. The next pressure surge in the exhaust collector derives, as already mentioned, from the interfering cylinder, i.e. the next cylinder in the firing order.

Because only one exhaust valve (the first valve) is used in an exhaust flow system according to the invention while the cylinder is being drained, the exhaust valves must be made larger than is the case in standard engines currently produced. It is probable that one of the exhaust valves must be made larger at the expense of the other, but it is also possible for both exhaust valves to be of the same size.

Figure 7:
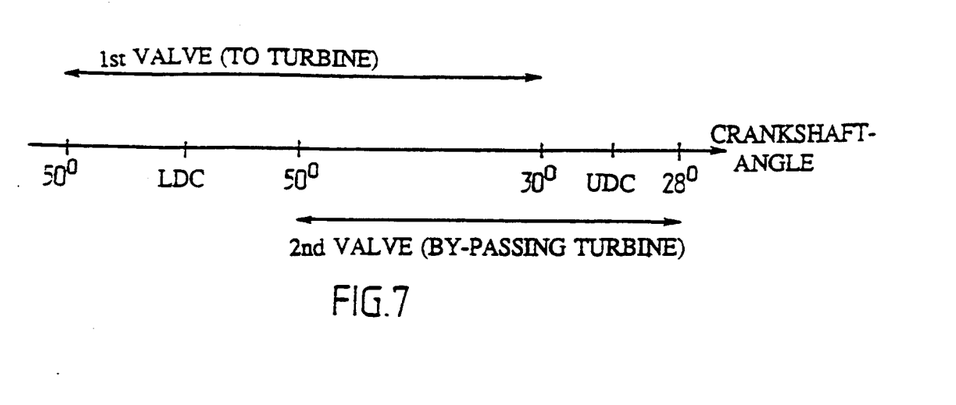
FIG. 7 shows the mutual relationship between the valve opening times for the first and second exhaust valves, respectively, of a cylinder in an internal combustion engine according to the invention.

The exhaust flow system according to the invention necessitates special care in designing the camshaft of the exhaust valves. It may be stated quite generally that the ideal valve times for both exhaust valves gives very short durations. Valve lift, which is possible theoretically, is substantially reduced as the duration is reduced. To obtain practicable valve lift curves it is necessary to expand the duration at both ends as far as possible. This should result in actual valve times largely in keeping with those shown in FIG. 7. The 1st valve (which is connected to the exhaust turbine) opens at the same crankshaft angle as that at which a standard engine opens the exhaust valves (i.e. 50 degrees before the lower dead center/LDC). The 2nd valve (whose exhaust gases are fed past the exhaust turbine) opens 50 degrees after the lower dead center. The 1st valve closes 30 degrees before the upper dead center(UDC), and this valve therefore obtains a duration of 200 degrees. This duration is selected on the basis of the following considerations. The interference pulses occur at intervals of 180 degrees. During the first crankshaft rotation degrees at which the valve is open the lift is so small that the pressure in the exhaust collector is hardly affected. Moreover the interference pulse is propagated at a finite speed (=the speed of sound). This generally means that the duration for the 1st valve should set to a maximum of 180 degrees+an arbitrary angle =200 degrees. The overlap between the 1st and 2nd valve will be 100 crankshaft rotation degrees, as shown. However, this large overlap is required to increase the duration and hence the valve lift. The 2nd valve closes 28 degrees after the upper dead center. Together with an intake cam which opens 27 degrees before the upper dead center, this gives an overlap between intake and exhaust of 55 degrees. However, a much shorter overlap between intake and exhaust would probably be sufficient in view of the pressure drop over the engine. The risk of collision with the piston determines how late the 2nd valve can close.

Figure 8:
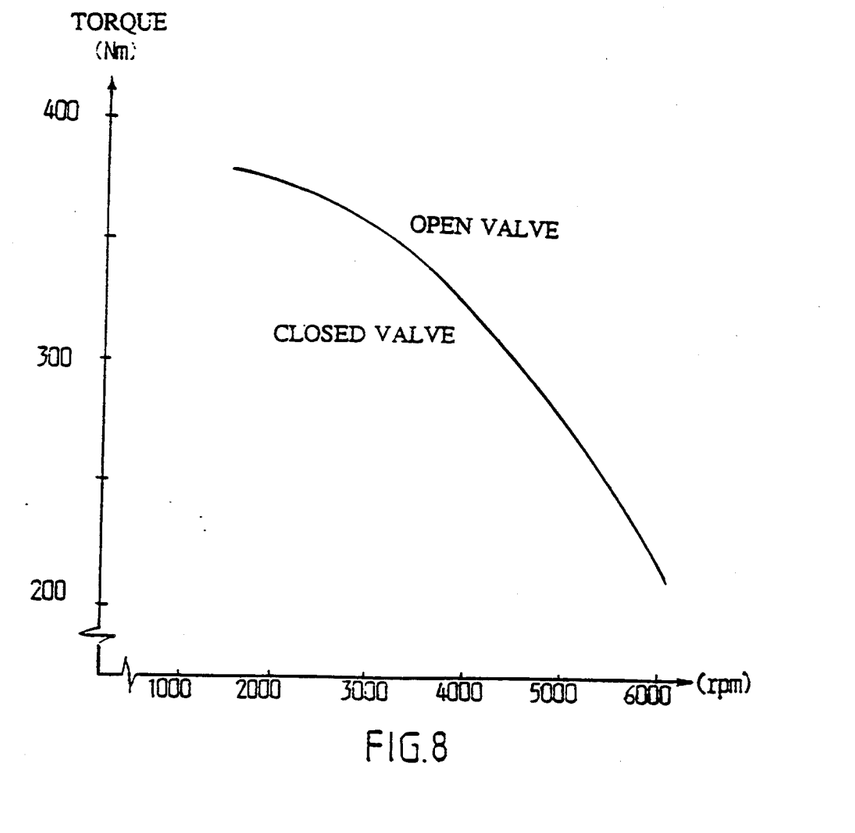
FIG. 8 shows, in functional form, the boundary line between the areas for the closed and open adjustable valve in the exhaust system, respectively, for the second exhaust valves of the cylinders.

As is evident from the above adjustable valve 50 for the exhaust flow from the second exhaust valves of the cylinders will in practice be closed under normal engine operating conditions. FIG. 8 shows an estimated boundary line between the operating case ranges for the adjustable valve in its closed and open conditions respectively.

As is shown in the figure the valve (denoted by 50 in FIGS. 1 and 2) is generally kept open only at speeds exceeding approximately 2000 rpm, and in the operating range above the load boundary line (limit) shown in the graph in FIG. 8. Below this boundary line the engine as already discussed above—is able to provide the desired torque with the valve closed. To prevent the engine from flushing out fuel into the exhaust system of the second exhaust valves of the cylinders during the intake/exhaust valve overlap (this only applies above the load boundary line (limit) shown in FIG. 8), the engine must in practice be fitted with a very large injection valve with the capacity to supply all the fuel to the engine for only part of the intake stroke (from 30 degrees after the upper dead center to the lower dead center), Alternatively it must have a phase adjustable intake valve cam, With a phase adjustable intake valve cam it should be possible to obtain such an intake/ exhaust valve overlap that the engine drains off the residual gases without flushing out fuel into the exhaust system of the other exhaust valves.

A phase adjustable intake valve cam has the advantage that it will enable reduction of the exhaust temperature and reducing misfiring at idle speed.

I claim:

1. An exhaust flow system for providing a split exhaust flow in a multi-cylinder internal combustion engine having a plurality of internal combustion engine cylinders, wherein the engine is fitted with an exhaust driven supercharger of the turbocompressor type, and wherein the supercharger has an exhaust driven turbocompressor, an exhaust turbine inlet and an exhaust turbine outlet;

the exhaust flow system comprising:

a respective first exhaust valve and second exhaust valve connected for receiving exhaust gas from each of the cylinders during the exhaust phase of the cylinder;

a first exhaust collector common to the cylinders, and the first exhaust valve of each cylinder being connected to the first exhaust collector;

a first exhaust branch pipe connected to the first exhaust collector and directly to the exhaust turbine inlet of the supercharger for delivering exhaust gas thereto;

a second exhaust pipe connected to each of the second exhaust valves for receiving exhaust gas released through the second exhaust valves; the second exhaust pipe being further connected to the exhaust turbine outlet for receiving exhaust gas therefrom;

an adjustable valve which is adjustable according to selected operating conditions of the engine and for being closed during selected engine operating conditions; the adjustable valve being positioned in the exhaust flow path between the second exhaust valves and the second exhaust pipe, and the adjustable valve being out of the pathway from the second exhaust turbine outlet into the exhaust pipe.

2. The exhaust flow system of claim 1, further comprising a silencer communicating with the second exhaust pipe downstream of the exhaust turbine outlet and downstream in the exhaust path of the connection of the adjustable valve to the second exhaust pipe.

3. The exhaust flow system of claim 2, wherein the adjustable valve is operable to a closed condition during normal engine operating conditions.

4. The exhaust flow system of claim 1, further comprising a second exhaust collector common to all of the second exhaust valves to which the second exhaust valves are connected; a second exhaust branch pipe connecting the second exhaust collector to the second exhaust pipe; and the adjustable valve being common to all of the second exhaust valves and the adjustable valve being located in the second exhaust branch pipe.

5. The exhaust flow system of claim 4, further comprising means at each first exhaust valve for keeping the first exhaust valve open around the lower dead center operation of the cylinder, whereby the first exhaust valve receives the primary exhaust flow of the respective cylinder.

6. The exhaust flow system of claim 1, further comprising means at each first exhaust valve for keeping the first exhaust valve open around the lower dead center operation of the cylinder, whereby the first exhaust valve receives the primary exhaust flow of the respective cylinder.

7. The exhaust flow system of claim 6, wherein the means for opening the first exhaust valve operates the first exhaust valve open during the last 50 crankshaft rotation degrees of the expansion stroke and the first 50 crankshaft rotation degrees of the exhaust stroke.

8. The exhaust flow system of claim 6, further comprising means at each of the second exhaust valves for keeping the second exhaust valve open after the respective piston of the respective cylinder passes the lower dead center, whereby the second exhaust valve of each cylinder provides a secondary, residual exhaust draining of the cylinder.

9. The exhaust flow system of claim 5, further comprising means at each of the second exhaust valves for keeping the second exhaust valve open after the respective piston of the respective cylinder passes the lower dead center, whereby the second exhaust valve of each cylinder provides a secondary, residual exhaust draining of the cylinder.

10. The exhaust flow system of claim 9, wherein the means for keeping the secondary exhaust valve open keeps the valve open from and including a crankshaft rotation in the respective cylinder of approximately 50 degrees from the lower dead center.

11. The exhaust flow system of claim 4, further comprising a silencer communicating with the second exhaust pipe downstream of the exhausts turbine outlet and downstream in the exhaust path of the connection between the second exhaust pipe and the adjustable valve;

an ejector connecting the second exhaust branch pipe to the second exhaust pipe at a location along the exhaust pipe between the outlet of the second exhaust turbine and the silencer.

12. The exhaust flow system of claim 4, further comprising a silencer communicating with the second exhaust pipe downstream of the exhaust turbine outlet and downstream in the exhaust path of the connection between the second exhaust pipe and the adjustable valve;
a catalytic exhaust cleaner connected in the exhaust pipe between the outlet of the second exhaust turbine and the silencer and upstream along the second exhaust pipe from the connection to the exhaust pipe by the second exhaust branch pipe.

13. The exhaust flow system of claim 4, further comprising a silencer communicating with the second exhaust pipe downstream of the exhaust turbine outlet and downstream in the exhaust path of the connection between the second exhaust pipe and the adjustable valve;
a catalytic exhaust cleaner connected in the exhaust pipe between the outlet of the second exhaust turbine and the silencer and downstream along the second exhaust pipe from the connection to the exhaust pipe by the second exhaust branch pipe.

14. The exhaust flow system of claim 1, wherein the adjustable valve includes an adjusting device operable to selectively open and close the valve and an electrical control unit and a signal cable from the electrical control unit to the adjusting device;
signal cables connected with the electrical control unit for supplying the electrical control unit with relevant operating parameter input signals; a plurality of sensors arranged in the engine and exhaust system and in the vehicle for providing information to the signal cables to the control unit, the control unit being adapted to receive the operating parameters and then operate the adjusting device for adjusting the adjustable valve.

15. The exhaust flow system of claim 4, further comprising a control unit connected with the adjustable valve, the control unit being operable to keep the adjustable valve closed below a predetermined engine speed regardless of the load level on the engine.

16. The exhaust flow system of claim 15, wherein the control unit is adapted to keep the adjustable valve closed below an engine speed of 2,000 rpm.

17. The exhaust flow system of claim 15, wherein the control unit is adapted for keeping the adjustable valve open at least at high engine load.

18. The exhaust flow system of claim 17, further comprising an adjusting device connected with the adjustable valve; the control unit being connected with the adjusting device, the adjusting device being adapted for keeping the second adjustable valve exhaust valves open according to engine load level which decreases as the engine speed increases.

19. A method for selective splitting and discharge of the exhaust flow from the cylinders of a multi-cylinder internal combustion engine, wherein the engine has an exhaust driven supercharger, each cylinder has a first exhaust valve for feeding a primary exhaust flow to the exhaust turbine inlet of the supercharger and a second exhaust valve for feeding a secondary residual exhaust flow to a point downstream in the exhaust flow from the exhaust turbine outlet of the supercharger, and the first and second exhaust valves are both connected to the respective cylinder at a location for receiving exhaust therefrom;
the method comprising:
selectively controlling the secondary exhaust flow from the second exhaust valves according to engine parameters by supplying engine parameters for controlling the secondary exhaust flow exhaust valves, wherein the controlling of the secondary exhaust flow is by a valving connected downstream from the second exhaust valves of the cylinders and downstream of the exhaust turbine outlet in the exhaust flow.

20. The method of claim 19, further comprising valving closed the secondary exhaust flow from the second exhaust valves at a speed below a predetermined level, regardless of engine load level.

21. The method of claim 20, wherein the secondary exhaust flow from the second exhaust valves is valved closed below a speed of 2,000 rpm and is kept closed below that speed.

22. The method of claim 21, wherein the secondary exhaust flow from the second exhaust valves is valved open at least at high load.

23. The method of claim 22, wherein the secondary exhaust flow from the second exhaust valves is valved open according to a load level which decreases as engine speed increases.

* * * * *